United States Patent
Beckmann et al.

(10) Patent No.: US 8,159,995 B2
(45) Date of Patent: Apr. 17, 2012

(54) METHOD AND FACILITY FOR SELECTING SATELLITE CHANNELS

(75) Inventors: Steffen Beckmann, Buxtehude (DE); Jörg Brenner, Hamburg (DE); Carl Mathias Cramer, Henstedt-Ulzburg (DE)

(73) Assignee: Siemens Programm-und Systementwicklung, GmbH & Co. KG, Hamburg (DE)

( * ) Notice: Subject to any disclaimer, the term of this patent is extended or adjusted under 35 U.S.C. 154(b) by 152 days.

(21) Appl. No.: 12/545,181

(22) Filed: Aug. 21, 2009

(65) Prior Publication Data

US 2010/0046389 A1    Feb. 25, 2010

(30) Foreign Application Priority Data

Aug. 25, 2008 (DE) .......................... 10 2008 039 584

(51) Int. Cl.
*H04L 12/28* (2006.01)
*H04B 7/185* (2006.01)

(52) U.S. Cl. .................................... 370/316; 370/395.21
(58) Field of Classification Search .................. 370/229, 370/230, 231, 233, 235, 394, 395.21, 410, 370/412, 413, 315, 316, 395.43; 714/748, 714/749
See application file for complete search history.

(56) References Cited

U.S. PATENT DOCUMENTS

| 5,561,838 | A | 10/1996 | Chandos et al. |
| 5,826,190 | A | 10/1998 | Krutz et al. |
| 6,512,761 | B1 * | 1/2003 | Schuster et al. ............... 370/352 |
| 6,741,554 | B2 * | 5/2004 | D'Amico et al. .............. 370/225 |
| 7,233,620 | B2 * | 6/2007 | Brommer ....................... 375/240 |

* cited by examiner

*Primary Examiner* — Hanh Nguyen

(57) ABSTRACT

A method for selecting satellite channels in a transmission system consisting of a data source, a data sink, satellite modems and a satellite radio link with a general channel and at least one dedicated channel is provided. The data sink prompts the data source, as a function of the transmission characteristics of the general channel, to set up a dedicated channel for further data transmission.

7 Claims, 1 Drawing Sheet

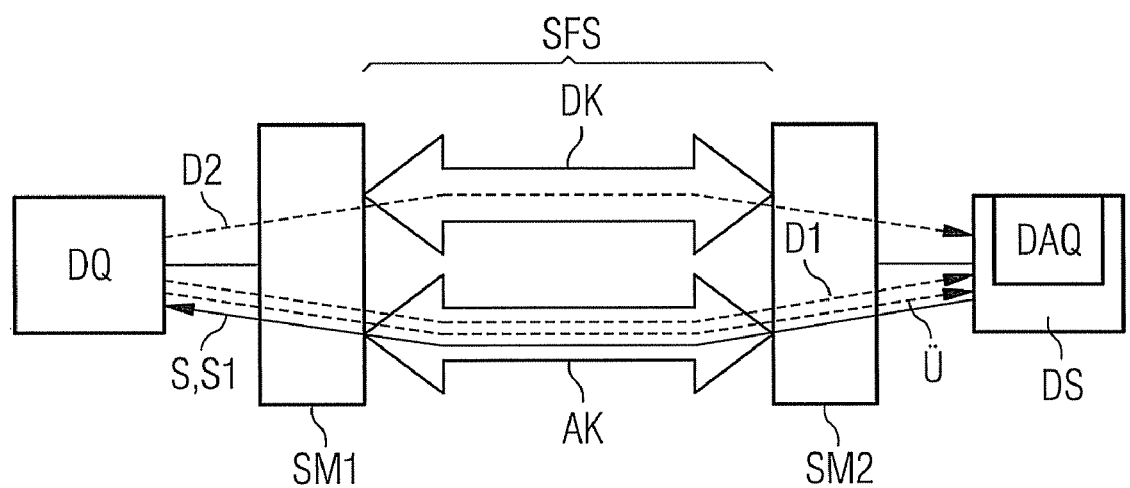

METHOD AND FACILITY FOR SELECTING SATELLITE CHANNELS

CROSS REFERENCE TO RELATED APPLICATIONS

This application claims priority of German Patent Application No. 10 2008 039 584.6 DE filed Aug. 25, 2008, which is incorporated by reference herein in its entirety.

FIELD OF INVENTION

The invention relates to a method and a facility for selecting satellite channels.

BACKGROUND OF INVENTION

Satellite radio links can be used to transmit data in areas of coverage that are a long way from the conventional infrastructure. Satellite radio links are also used for data transmission lines that are only required in the short term, for example for radio broadcast reporting. In most instances, as with GSM mobile radio, individual users are provided by the operator of the satellite with so-called SIM cards, which are used to identify and charge users.

The user can use a satellite modem with corresponding SIM card and connected transmit apparatus to utilize various services of the satellite radio link and/or the infrastructure connected downstream of this and thus for example accept a data connection to the internet or exchange data directly with a further user. To this end the user can request a so-called allocated or dedicated channel, which has certain characteristics (e.g. bandwidth) guaranteed by the operator of the satellite. It is also possible to utilize a general channel (background channel), which is available to all users at the same time and therefore certain transmission characteristics of this general channel are not guaranteed for individual users. However in practice it is desirable to use this general channel by preference, as this allows much more economical data transmission than when an allocated channel is used, in particular as time-dependent charges are generally incurred for reserving an allocated channel, while billing is based on data quantities when the general channel is used.

U.S. Pat. No. 5,826,190A describes a method which allows switching between satellite radio channels if a subscriber terminal experiences receive problems on the channel allocated to it. U.S. Pat. No. 5,561,838A discloses a similar method, in which data transmission is switched to a channel of a further satellite and the parameters required for this are determined and transferred.

SUMMARY OF INVENTION

An object of the invention is to specify a method and facilities for selecting satellite channels, with which data transmission is switched between the general channel and a dedicated channel as a function of transmission characteristics of the general channel.

The object is achieved by a method and facilities as claimed in the claims.

According to the basic concept of the invention a (digital) data transmission link consisting of a data source, a satellite modem, a satellite radio link and a second receiving satellite modem as well as a data sink is set up, which provides users at least with a general (data transmission) channel and on request from users provides users respectively with at least one dedicated (data transmission) channel, with continuous determination of the transmission characteristics of the general channel taking place during the transmission of data by way of the general channel and if these transmission characteristics drop below a certain threshold value, a switch command is output to the satellite modem of the data source, which causes a dedicated channel to be requested by the satellite modem of the data source.

This has the advantage that the general channel of a satellite radio link can be used for data transmission with data transmission only being transferred to a dedicated channel when the transmission characteristics of the general channel are inadequate and being switched back to the general channel when the transmission characteristics of the general channel assume the necessary value once again.

The main aspect of the solution proposed in the invention is the continuous determination of the transmission characteristics of the general channel. To this end the satellite modem of the data sink uses a data transmission quality analysis facility to analyze the transmission characteristics determined from the payload stream or other information sources on a continuous basis. These transmission characteristics are determined for example from the data packet loss rate, with a control command to set up a dedicated channel being output if a certain loss rate is exceeded. Further transmission characteristics can be derived for example from the RTP (realtime protocol, standardized to IETF, RFC 3550) frequently used for audio and video transmissions, as data packets according to the RTP have a time stamp and sequence number, from which conclusions can be drawn about the transmission characteristics of the satellite radio link, as the incorrect sequencing of data packets increases as transmission characteristics deteriorate. Incorrect sequencing, in other words data packets not arriving in send order at the data sink (caused for example by lower (hardware-related) protocol levels due to the repeated transmission of lost data packets), is particularly disruptive for the transmission of continuous data streams (e.g. audio and video data streams), as data packets that arrive late can generally no longer be inserted into the output data stream and are anyway replaced to a certain degree by coding of the audio or video data stream. The frequency of the occurrence of incorrectly sequenced data packets is therefore a preferred indicator of the transmission characteristics of a satellite radio link.

One further option for determining the transmission characteristics of the satellite radio link is to analyze the so-called jitter buffer of the data sink. To output a continuous data stream the data sink has a jitter buffer, from which the individual data packets or even individual payload words are output at a specified rate. The jitter buffer has the task of storing a reservoir of payload in the correct sequence to compensate for fluctuations in the speed of payload delivery (by way of the satellite radio link). If significant fluctuations in this speed are anticipated (which generally indicates fluctuating transmission characteristics), the capacity of the jitter buffer should be increased. Determination of the fill level of the jitter buffer of the data sink is therefore a preferred feature of the transmission characteristics.

In one particular embodiment of a jitter buffer (adaptive jitter buffer) provision is made for a variable storage unit capacity, with the pattern over time (fluctuation) of the payload delivery rate to the storage unit of the jitter buffer being used to determine the capacity of said storage unit, so that a continuous data output from this storage unit is possible at a constant data rate. This capacity determined by the adaptive jitter buffer is a particularly suitable feature of the transmission characteristics of a satellite radio link.

According to the invention provision is made for a switch command to be output from the data sink to the data source prompting the data source to request a dedicated channel. This switch command is transmitted by way of a control channel. This switch command is also used to prompt the cancelation of the dedicated channel and therefore the resumption of data transmission by way of the general channel.

According to the invention the transmission characteristics of the general channel are determined during the transmission of data by way of a dedicated channel, with the result that data transmission can be transferred to the general channel as soon as the transmission characteristics of the general channel permit this. The transmission characteristics of the general channel are determined by transmitting monitoring data (narrowband monitoring signal) from the data source by way of the general channel to the data sink while the payload is being routed by way of a dedicated channel. The data sink uses the monitoring data received by the data sink or other information sources to determine the transmission characteristics of the general channel and, as soon as the transmission characteristics reach a certain value, sends a switch command by way of the control channel to the data source, prompting the data source to cancel the dedicated channel and continue data transmission by way of the general channel.

It is possible with the inventive method to transmit continuous payload streams (particularly audio and video data streams) by way of satellite radio links, in this process selecting the respective channel having the required minimum transmission characteristics, with the general channel being selected for the time periods when said (more economical) general channel has said characteristics and a dedicated channel being used during the periods when the general channel does not have these minimum transmission characteristics.

The inventive method is also advantageously suitable for transmitting bi-directional data streams, with the connection partners involved in this instance representing both a data source and a data sink at the same time. Both connection partners here can be equipped with a data transmission quality analysis facility or just one connection partner can be equipped with a data transmission quality analysis facility.

BRIEF DESCRIPTION OF THE DRAWINGS

FIGURE shows an example of a satellite transmission system.

DETAILED DESCRIPTION OF INVENTION

The FIGURE shows a schematic diagram of an example of the basic structure of a satellite transmission system. The satellite transmission system comprises a data source DQ, which is connected to a first satellite modem SM1, a satellite radio link SFS and a data sink DS, which is connected to a second satellite modem SM2. The satellite radio link SFS comprises all the assemblies required for a data transmission by way of satellites, such as antennas, amplifiers, satellite, etc., which are not shown in the FIGURE, as these assemblies are not affected by the inventive method and the inventive facilities. A general channel AK and a dedicated channel DK are present between the satellite modems SM1 and SM2. Dedicated channels DK are set up at the request of the data source DQ and offer certain specified transmission characteristics. The general channel AK is available equally to all users of the satellite transmission system and does not provide fixed transmission characteristics, the transmission characteristics, in particular the bandwidth, being a function for example of the number of users using this general channel at the same time. At the start of the data transmission the data source DQ routes the data stream D1 by way of the general channel AK to the data sink DS. The data sink DS uses a data transmission quality analysis facility DAQ contained in the data sink DS to determine the transmission characteristics of the general channel AK on a continuous basis from the received payload stream D1. If the transmission characteristics thus determined drop below certain minimum values, the data sink DS outputs a control command to use a dedicated channel S to the data source DQ by way of the general channel AK. Further to the received control command S the data source DQ requests a dedicated channel DK to the data sink DS from the satellite modem SM1 and, once this dedicated channel DK has been set up, routes the payload stream D2 by way of this dedicated channel DK to the data sink DS. If data transmission takes place by means of a payload stream D2 by way of a dedicated channel, the data source DQ generates a monitoring data stream Ü and routes this by way of the general channel AK to the data sink DS. The data sink DS then receives both the payload stream D2 by way of a dedicated channel and the monitoring data stream Ü by way of the general channel AK and determines the transmission characteristics of the general channel AK from the received monitoring data stream Ü by means of the data transmission quality analysis facility DAQ. If the transmission characteristics thus determined exceed certain minimum values, the data sink DS outputs a control command to use the general channel S1 to the data source DQ by way of the general channel AK. The data source DQ then interrupts transmission of the monitoring data stream Ü and further to the received control command S2 routes the payload stream D1 to the data sink DS by way of the general channel AK and asks the satellite modem SM1 to cancel the dedicated channel DK. Further data transmission now takes place again as payload stream D1 by way of the general channel AK until the transmission characteristics of the general channel AK drop below certain minimum values again and the payload stream is transferred to a dedicated channel DK.

The invention claimed is:

1. A method of selecting satellite channels in a transmission system, comprising:
    providing a data source, a data sink, satellite modems and a satellite radio link with a general channel and a dedicated channel;
    transmitting a data stream at a start of a data transmission via the general channel;
    determining transmission characteristics of the general channel based upon the data stream by the data sink;
    sending a control command by the data sink to the data source when the transmission characteristics of the general channel drop below certain minimum transmission characteristics;
    prompting the data source by the data sink to use the dedicated channel for a further data transmission;
    transmitting a monitoring data stream by the data source via the general channel to the data sink concurrent to the data transmission by the data source to the data sink via the dedicated channel;
    determining the transmission characteristics of the general channel based upon the monitoring data stream transmitted by the data sink;
    sending a control command by the data sink to the data source when certain minimum transmission characteristics of the general channel, as determined based upon the monitoring stream, are exceeded; and prompting the data source by the data sink to use the general channel for further data transmission.

2. The method as claimed in claim 1, wherein the data sink uses a data transmission quality analysis device for determining the transmission characteristics of the general channel.

3. The method as claimed in claim 2, wherein the data transmission quality analysis device determines the transmission characteristics of the general channel from a number of incorrectly sequenced data packets of the data stream.

4. The method as claimed in claim 2, wherein the data transmission quality analysis device determines the transmission characteristics of the general channel from a fill level of a jitter buffer of the data sink.

5. The method as claimed in claim 2, wherein the data transmission quality analysis device determines the transmission characteristics of the general channel from a data packet loss rate measured by a receiving satellite modem.

6. A data sink, comprising:
- a data transmission quality analysis device configured to determine transmission characteristics of a general channel of a satellite radio link based upon a data stream,
- a device configured to compare the determined transmission characteristics with certain minimum transmission characteristics;
- a device configured to send a control command to a data source to switch further data transmission to a dedicated channel of the satellite radio link when the determined transmission characteristics drop below the minimum transmission characteristics;
- the data transmission quality analysis device configured to determine the transmission characteristics of the general channel based upon a monitoring data stream transmitted by the data source via the general channel concurrently with the data transmission via the dedicated channel; and
- a device configured to send a control command to the data source to switch the further data transmission from the dedicated channel to the general channel when the determined transmission characteristics exceed the minimum transmission characteristics.

7. A data source, comprising means, which, during a data transmission via a general channel of a satellite radio link to a data sink, are configured to
- set up a dedicated channel of the satellite radio link to the data sink and carry out further data transmission via the dedicated channel upon receipt of a control command from the data sink,
- transmit a monitoring data stream via the general channel to the data sink concurrently while transmitting data via the dedicated channel,
- cancel the dedicated channel and carry out the further data transmission via the general channel upon receipt of a control command from the data sink, and
- interrupt the monitoring data stream via the general channel to the data sink.

* * * * *